(12) United States Patent
Youm

(10) Patent No.: US 8,117,241 B2
(45) Date of Patent: Feb. 14, 2012

(54) METHOD AND APPARATUS FOR GENERATING MEDIA-EXCHANGEABLE MULTIMEDIA DATA AND METHOD AND APPARATUS FOR RECONSTRUCTING MEDIA-EXCHANGEABLE MULTIMEDIA DATA

(75) Inventor: Sun-hee Youm, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/035,074

(22) Filed: Feb. 25, 2011

(65) Prior Publication Data

US 2011/0153682 A1 Jun. 23, 2011

Related U.S. Application Data

(63) Continuation of application No. 12/021,716, filed on Jan. 29, 2008, now Pat. No. 7,917,546.

(30) Foreign Application Priority Data

Aug. 9, 2007 (KR) .......................... 10-2007-0080328

(51) Int. Cl.
*G06F 17/30* (2006.01)
(52) U.S. Cl. ........................................................ 707/803
(58) Field of Classification Search .................. 707/803, 707/999.104
See application file for complete search history.

(56) References Cited

U.S. PATENT DOCUMENTS

| | | | |
|---|---|---|---|
| 5,574,905 A | 11/1996 | deCarmo | |
| 6,061,333 A | 5/2000 | Joe et al. | |
| 6,128,617 A | 10/2000 | Lowry | |
| 6,311,179 B1 | 10/2001 | Agarwal et al. | |
| 6,356,902 B1 | 3/2002 | Tan et al. | |
| 6,760,903 B1 | 7/2004 | Morshed et al. | |
| 7,149,750 B2* | 12/2006 | Chadwick | 1/1 |
| 2002/0065886 A1* | 5/2002 | Kim et al. | 709/205 |
| 2002/0087530 A1* | 7/2002 | Smith et al. | 707/3 |
| 2002/0184506 A1* | 12/2002 | Perlman | 713/182 |
| 2003/0225791 A1 | 12/2003 | Stauder et al. | |
| 2004/0054653 A1* | 3/2004 | Dufour et al. | 707/1 |
| 2004/0114811 A1* | 6/2004 | Lim et al. | 382/232 |
| 2004/0133882 A1* | 7/2004 | Angel et al. | 717/130 |

(Continued)

FOREIGN PATENT DOCUMENTS

JP 2006-127574 A 5/2006

(Continued)

OTHER PUBLICATIONS

Li et al., Hierarchical Scheduling and Allocation of Multirates system hetrogenious multiprocessor, Princeton University, 1997, 6 pages.

(Continued)

*Primary Examiner* — Tony Mahmoudi
*Assistant Examiner* — Noosha Arjomandi
(74) *Attorney, Agent, or Firm* — Sughrue Mion, PLLC

(57) ABSTRACT

A method of generating multimedia data is provided. The method includes generating a scene tree by allocating at least one piece of object information to each of a plurality of nodes and then linking the nodes based on the relationship between a plurality of pieces of object information allocated to the nodes, adding a null node to which the object information of an exchangeable media object is allocated, and thereafter recording the null node in a scene descriptor area in a scene description language.

13 Claims, 6 Drawing Sheets

U.S. PATENT DOCUMENTS

| | | | |
|---|---|---|---|
| 2005/0132385 A1* | 6/2005 | Bourges-Sevenier | 719/328 |
| 2006/0168156 A1* | 7/2006 | Bae et al. | 709/220 |
| 2006/0282789 A1* | 12/2006 | Kim | 715/764 |
| 2007/0055697 A1* | 3/2007 | Parlin et al. | 707/104.1 |
| 2007/0143527 A1 | 6/2007 | Mazzagatti et al. | |
| 2007/0174275 A1 | 7/2007 | Kan et al. | |
| 2008/0261554 A1 | 10/2008 | Keller et al. | |

FOREIGN PATENT DOCUMENTS

| | | |
|---|---|---|
| KR | 10-0622645 B1 | 9/2006 |

OTHER PUBLICATIONS

Nguyen et al., Path Diversity and Bandwith Allocation for Multimedia Streaming, University of California, Berkley, 2003, 4 pages.

\* cited by examiner

● NULL NODE

METHOD AND APPARATUS FOR GENERATING MEDIA-EXCHANGEABLE MULTIMEDIA DATA AND METHOD AND APPARATUS FOR RECONSTRUCTING MEDIA-EXCHANGEABLE MULTIMEDIA DATA

CROSS-REFERENCE TO RELATED PATENT APPLICATIONS

This is a Continuation of application Ser. No. 12/021,716 filed Jan. 29, 2008 which claims priority from Korean Patent Application No. 10-2007-0080328, filed on Aug. 9, 2007, in the Korean Intellectual Property Office, the disclosures of which are incorporated herein in their entireties by reference.

BACKGROUND OF THE INVENTION

1. Field of the Invention

The present invention relates to a method of generating object-oriented multimedia data and a method of reconstructing the same, and more particularly, to a method of generating object-oriented multimedia data so that some of a plurality of objects constituting the multimedia data can be changed to have a user's desired attributes, and a method of reconstructing the same.

2. Description of the Related Art

Recently, advent of various digital broadcasting environments, such as digital multimedia broadcasting (DMB), has resulted in development of application service models that provide various data services. An object-oriented multimedia system is capable of processing media items of video in units of objects and is thus very available for providing interactive services. In the fields of mobile broadcasting or communications, techniques of providing data services using an MPEG-4 Binary Format of Scene (BIFS) have been introduced.

An MPEG-4 system composes a scene with various video/audio media objects by using a scene descriptor, and enables the media objects to be processed in units of objects. MPEG-4 BIFS which is a standard MPEG-4 technique of scene description is used in determining the temporal/spatial arrangement of audio or video objects, and is transmitted together with the result of encoding the video or audio objects.

FIG. 1 is a diagram illustrating a related art method of composing a multimedia scene 120 by using a scene tree.

Referring to FIG. 1, a scene tree 102 is a hierarchical structure in which nodes allocated to objects that constitute one multimedia scene are linked to one another. A scene descriptor stream 104 contains information regarding the scene tree 102 and the nodes of the scene tree 102, and an object descriptor stream 106 contains information regarding the respective objects. A first media source 112 represents a moving picture, a second media source 114 and a third media source 116 represent still images, and a fourth media source 118 represents sound.

The multimedia scene 120 is composed by arranging the media sources 112 through 118 in temporal and spatial locations that have been defined in an encoding process based on the information in the scene descriptor stream 104 and the object descriptor stream 106, and then executing a predetermined event.

FIG. 2 is a diagram illustrating a related art method of changing an object. Referring to FIG. 2, a first scene 120 is a multimedia scene constructed using objects being initially set during an encoding process. According to the related art method, a transmitting side instructs that a BIFS be changed in order to change each of multimedia objects. For example, the transmitting side deletes a node allocated to the first media source 112 of FIG. 1 from a first scene tree 202 in order to change the first media source 112. Then the scene tree 202 is changed to a second scene tree 212 since the node designating the first media source 112 is deleted. Thereafter the transmitting side inserts a new node containing desired media information into the scene tree 212 thus generating a third scene tree 222. A second scene 220 shows the result of executing a media source changed with the third scene tree 222 into which the new node has been inserted.

However, it is difficult to maximize the advantages of interactive multimedia when using the related art method in which the transmitting side individually gives commands in order to change information regarding each object of the multimedia. Also, the related art method is inefficient in terms of reproducing a large amount of multimedia contents while processing an event in real time.

SUMMARY OF EXEMPLARY EMBODIMENTS OF THE INVENTION

Exemplary embodiments of the present invention provide a method and apparatus for generating multimedia data, which are capable of allowing information regarding executing an event of each object of a multimedia presentation to be easily changed by a user or from the outside.

Exemplary embodiments of the present invention also provide a method and apparatus for reconstructing a multimedia presentation by executing an event based on changed object information in order to obtain a desired result of executing a multimedia event, using multimedia data generated by the above method and apparatus for generating multimedia data.

According to an aspect of the present invention, there is provided a method of generating multimedia data, the method comprising generating a scene tree by allocating at least one piece of object information to each of a plurality of nodes and linking the nodes to one another based on the relationship between a plurality of pieces of object information allocated to the nodes; adding a null node to which the object information of an exchangeable media object is allocated, to the scene tree; and recording the null node in a scene descriptor area in a scene description language.

The adding of the null node may include adding a null node for changing address information designating a media source in response to a request for an event change from the outside, where the address information may be included in the object information allocated to the nodes.

A base multimedia template may be predetermined using objects allocated to the nodes except for the null node, and an event of each of the objects may be predetermined.

The adding of the null node may comprise defining an image, which is to be displayed when a media source is not designated by the null node, in the object information allocated to the null node.

The adding of the null node may comprise defining an activation indicator activeflag indicating whether an event that is to be executed with the object information allocated to the null node is to be activated, in the object information allocated to the null node.

According to another aspect of the present invention, there is provided a method of reconstructing multimedia data, the method comprising determining a null node to which object information of a media object that is to be changed in response to a request for an event change is allocated, in a scene tree generated by linking a plurality of nodes to which object information is allocated to one another; changing the object information allocated to the null node; and reconstructing the multimedia data by executing an event according to the changed object information.

The determining of the null node may comprise if the request for an event change is received, detecting the null node corresponding to a predetermined multimedia object from the scene tree showing the relationship between a plurality of objects constituting the multimedia.

The changing of the object information allocated to the null node may comprise changing address information from among the object information allocated to the null node.

The address information may designate at least one of a predetermined media source and an external accessible media source.

The reconstructing of the multimedia data may comprise executing each event by using the object information allocated to each of the nodes.

If the request for an event change is received, a terminal that supports multimedia data and is allowed to edit and to change the object information allocated to the null node, may change a media object indicated in the request and then execute a corresponding event; and a terminal that does not support the multimedia data executes an initial media event of the null node.

According to another aspect of the present invention, there is provided an apparatus for generating multimedia data, the apparatus comprising a scene tree generation unit generating a scene tree by allocating at least one piece of object information to each of a plurality of nodes and then linking the nodes to one another based on the relationship between a plurality of pieces of object information allocated to the nodes; a null node addition unit adding a null node to which the object information of an exchangeable media object is allocated; and a recording unit recording the null node in a scene descriptor area in a scene description language.

According to another aspect of the present invention, there is provided an apparatus for reconstructing multimedia data, the apparatus comprising a null node determination unit determining a null node to which object information of a media object that is to be changed in response to a request for an event change is allocated, in a scene tree generating by linking a plurality of nodes to which object information is allocated to one another; an object information changing unit changing the object information allocated to the null node; and a reconstructing unit reconstructing the multimedia data by executing an event according to the changed object information.

According to another aspect of the present invention, there is provided a computer readable medium having recorded thereon a program for executing a method of generating multimedia data.

According to another aspect of the present invention, there is provided a computer readable medium having recorded thereon a program for executing a method of reconstructing multimedia data.

In the method and apparatus for multimedia data according to an exemplary embodiment of the present invention, an event can be executed using a media source determined by a user or from the outside by adding a null node for changing object information from the outside to a scene tree, thereby allowing easy exchange of new media objects.

Also, it is possible to provide a user with a template for exchanging only media sources of an exchangeable object while an event of each of multimedia objects is executed. Also, a user can compose a desired multimedia presentation by performing various graphic processing on or processing an event of a media object since a desired media source can be easily designated using a template according to an exemplary embodiment of the present invention.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

A method and apparatus for generating multimedia data and a method and apparatus for reconstructing multimedia data according to exemplary embodiments of the present invention will now be described in greater detail with reference to FIGS. 3 through 8.

Hereinafter, executing an object event or a media event means executing an operation defined in a media source, for example, video or audio reproduction.

Figure 3:
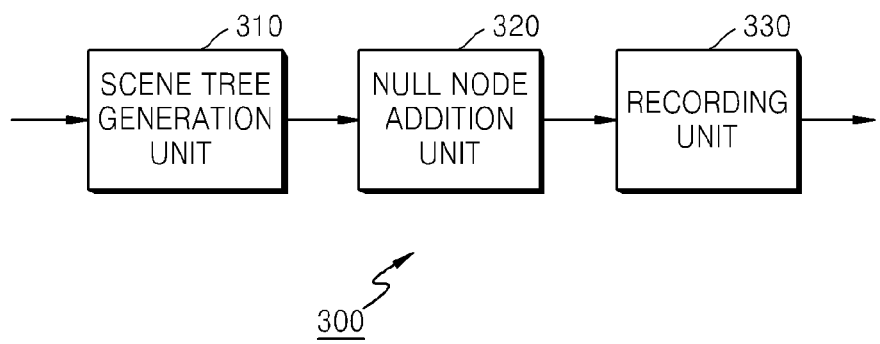
FIG. 3 is a block diagram of an apparatus for generating multimedia data according to an exemplary embodiment of the present invention.

FIG. 3 is a block diagram of an apparatus 300 for generating multimedia data according to an exemplary embodiment of the present invention. The generating apparatus 300 includes a scene tree generation unit 310, a null node addition unit 320, and a recording unit 330.

The scene tree generation unit 310 allocates at least one piece of object information to each of a plurality of nodes, generates a first scene tree by linking the nodes to one another based on the relationship between a plurality of pieces of the object information allocated to the nodes, and then outputs the scene tree to the null node addition unit 320, using received multimedia objects.

The null node addition unit 320 receives the first scene tree from the scene tree generation unit 310, generates a second scene tree by adding a null node to which information of an exchangeable media object is allocated to the first scene tree, and then outputs the second scene tree to the recording unit 330.

According to another exemplary embodiment of the present invention, the null node addition unit 320 adds a null node for changing address information designating a media source from among the object information allocated to the nodes, in response to a request for an event change from the outside.

According to another exemplary embodiment of the present invention, the null node addition unit 320 defines video that is to be displayed when a null node does not contain a media source designated, in object information allocated to the null node. For example, if the null node does not contain a media source designated, video indicated with an "X" mark may be defined in the object information allocated to the null node so that the video can be reproduced.

Alternatively, the null node addition unit 320 defines an activation indicator indicating whether an event that is to be executed with object information allocated to a null node is to be activated, in the object information allocated to the null node.

Alternatively, the null node addition unit 320 defines a predetermined event that is to be executed using a media object corresponding to an exchangeable object allocated to a null node.

The recording unit 330 outputs multimedia data obtained by describing the null node in a scene descriptor area in a scene description language by using the second scene tree received from the null node addition unit 320.

Alternatively, in the generating apparatus 300, a base multimedia template may be predetermined using objects allocated to the nodes except for the null node, and an event for each of the objects may be predetermined.

Figure 4:
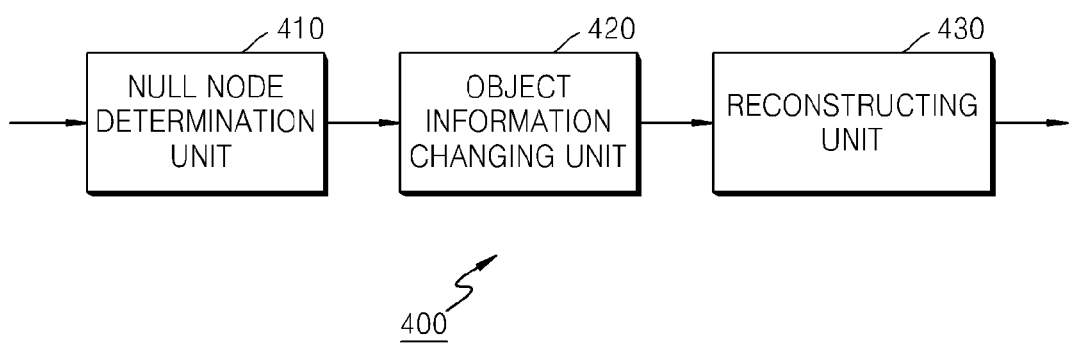
FIG. 4 is a block diagram of an apparatus for reconstructing multimedia data according to an exemplary embodiment of the present invention.

FIG. 4 is a block diagram of an apparatus 400 for reconstructing multimedia data according to an exemplary embodiment of the present invention. The reconstructing apparatus 400 includes a null node determination unit 410, an object information changing unit 420, and a reconstructing unit 430.

The null node determination unit 410 determines a null node to which object information regarding an object that is to be exchanged in response to a request for an event change is allocated, from a scene tree, and then outputs information regarding the null node to the object information changing unit 420, where the scene tree is generated by linking a plurality of nodes to which a plurality of pieces of object information regarding received multimedia data are allocated.

Alternatively, if a request for an event change is input, the null node determination unit 410 may detect a null node corresponding to predetermined media object from the scene tree.

The object information changing unit 420 receives the information regarding the null node determined by the null node determination unit 410, changes the object information allocated to the null node, and then transmits the information regarding the null node to the reconstructing unit 430.

Alternatively, the object information changing unit 420 may change address information among the object information allocated to the null node. The address information may indicate at least one of a predetermined media source and an external accessible media source.

The reconstructing unit 430 receives the changed object information from the object information changing unit 420, reconstructs multimedia data by executing an object event according to the changed object information, and then outputs the multimedia data multimedia data.

Alternatively, the reconstructing unit 430 may execute a plurality of events by using object information allocated to the respective nodes.

Alternatively, in response to a request for an event change, if the reconstructing apparatus 400 is a terminal that supports multimedia data that can be changed by editing object information allocated to a null node, the reconstructing apparatus 400 executes an event by changing a media object designated in the request for the event change. However, if the reconstructing apparatus 400 is a terminal that does not support multimedia data that can be changed by editing object information allocated to a null node, the reconstructing apparatus 400 executes only an initial media event for the null node.

Figure 5A:
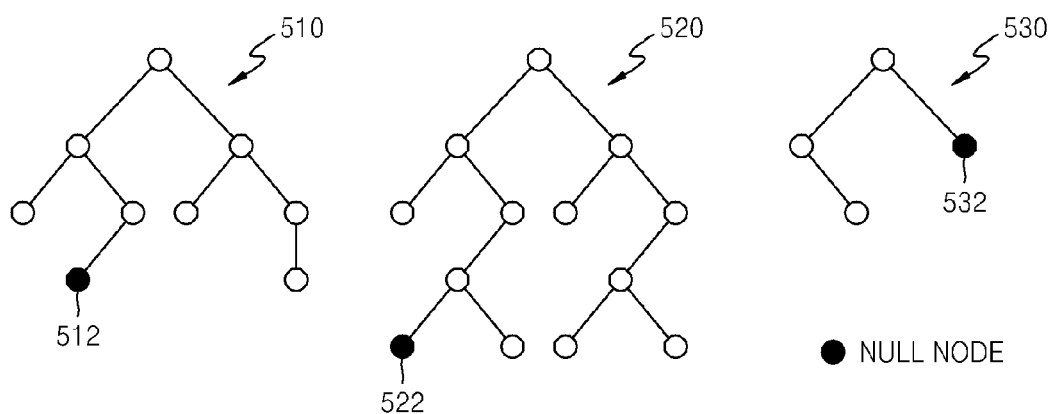
FIG. 5A is a diagram illustrating a method of defining a null node according to an exemplary embodiment of the present invention.

FIG. 5A is a diagram illustrating a method of defining a null node according to an exemplary embodiment of the present invention. That is, FIG. 5A illustrates the operations of the scene tree generation unit 310 and the null node addition unit 320 of the generating apparatus 300, or the operation of the null node determination unit 410 of the reconstructing apparatus 400.

First through third scene trees 510, 520 and 530 are embodiments of a scene tree to which a null node is added, according to the present invention.

A first node 512 is a null node added to the first scene tree 510, a second node 522 is a null node added to the second scene tree 520, and a third node 532 is a null node added to the third scene tree 530.

The scene tree generation unit 310 generates a scene tree by allocating at least one piece of object information to each of a plurality of nodes and then linking the nodes to one another based on the relationship between the allocated pieces of the object information.

A null node is allocated to a desired object among multimedia video objects that are to be constructed using a scene tree so that a user can change media information of the desired object. The null node addition unit 320 can respectively add the null nodes 512, 522, and 532 to desired locations of the respective scene trees 510, 520, and 530 generated by the scene tree generation unit 310.

In order to reconstruct multimedia data generated by the generating apparatus 300, in response to a request for event change from the outside, the null node determination unit 410 of the reconstructing apparatus 400 detects the null node 512, 522 or 532 corresponding to the request from the scene trees 510 through 530, and then the object information changing unit 420 determines a null node for changing object information.

Figure 5B:
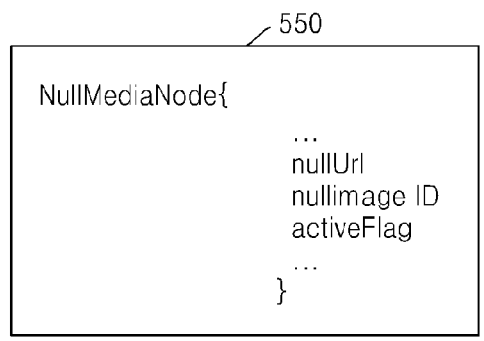
FIG. 5B illustrates definition of object information of a null node according to an exemplary embodiment of the present invention.

FIG. 5B illustrates definition of object information 550 of a null node according to an exemplary embodiment of the present invention. That is, FIG. 5B explains the functions of the recording unit 330 of the generating apparatus 300 and the object information changing unit 420 of the reconstructing apparatus 400.

Referring to FIG. 5B, NullMediaNode defines the object information of the null node.

"nullUrl" indicates an address of a location where a media source for executing an event of an object indicated by the null node is recorded.

"nullImage ID" indicates an address of video that is to be displayed if a media source of an object allocated to the null node has yet to be defined.

"activeFlag" is an activation indicator indicating whether the event of the object information allocated to the null node is to be activated.

If "activeFlag" is "0", the event of the object is not activated regardless of whether nullUrl is indicated or not. If activeFlag is "1", the event of the object is executed while reflecting the address indicated in "nullUrl".

The recording unit 330 of the generating apparatus 300 records initial object information of the null node in a scene descriptor area of multimedia data in a scene description language. Thus the recording unit 330 records NullMediaNode that contains "nullUrl," "nullImage ID," and "activeFlag" in the scene description language.

In an exemplary embodiment of the present invention, the object information changing unit 420 of the reconstructing apparatus 400 changes address information in the scene descriptor area so that a user can variously change a media source for executing an event for each of objects allocated to the null nodes 512, 522, and 532. Thus the user can change the address indicated by the address information "nullUrl" to the address of a desired media source so as to execute the event of a corresponding object by using the desired media source.

Also, the object information changing unit 420 can control execution of the event of the object allocated to the null node by changing activeFlag.

In an exemplary embodiment of the present invention, the object information changing unit 410 can change the address information "nullUrl" of the null node to an address indicating at least one of a predetermined media source and an external accessible media source.

For example, if English subtitles, Japanese subtitles, and Korean subtitles are included as media sources of a subtitle object in a dictionary stored in a multimedia reproducing system, the user can change the address information "nullUrl" to the address of one of the English subtitles, the Japanese subtitles, and the Korean subtitles. Also, in an exemplary embodiment of the present invention, it is possible to use a source that can be accessed via a wired/wireless network rather than by the multimedia reproducing system by changing the address information "nullUrl" to an Internet address of desired language subtitles.

Figure 6:
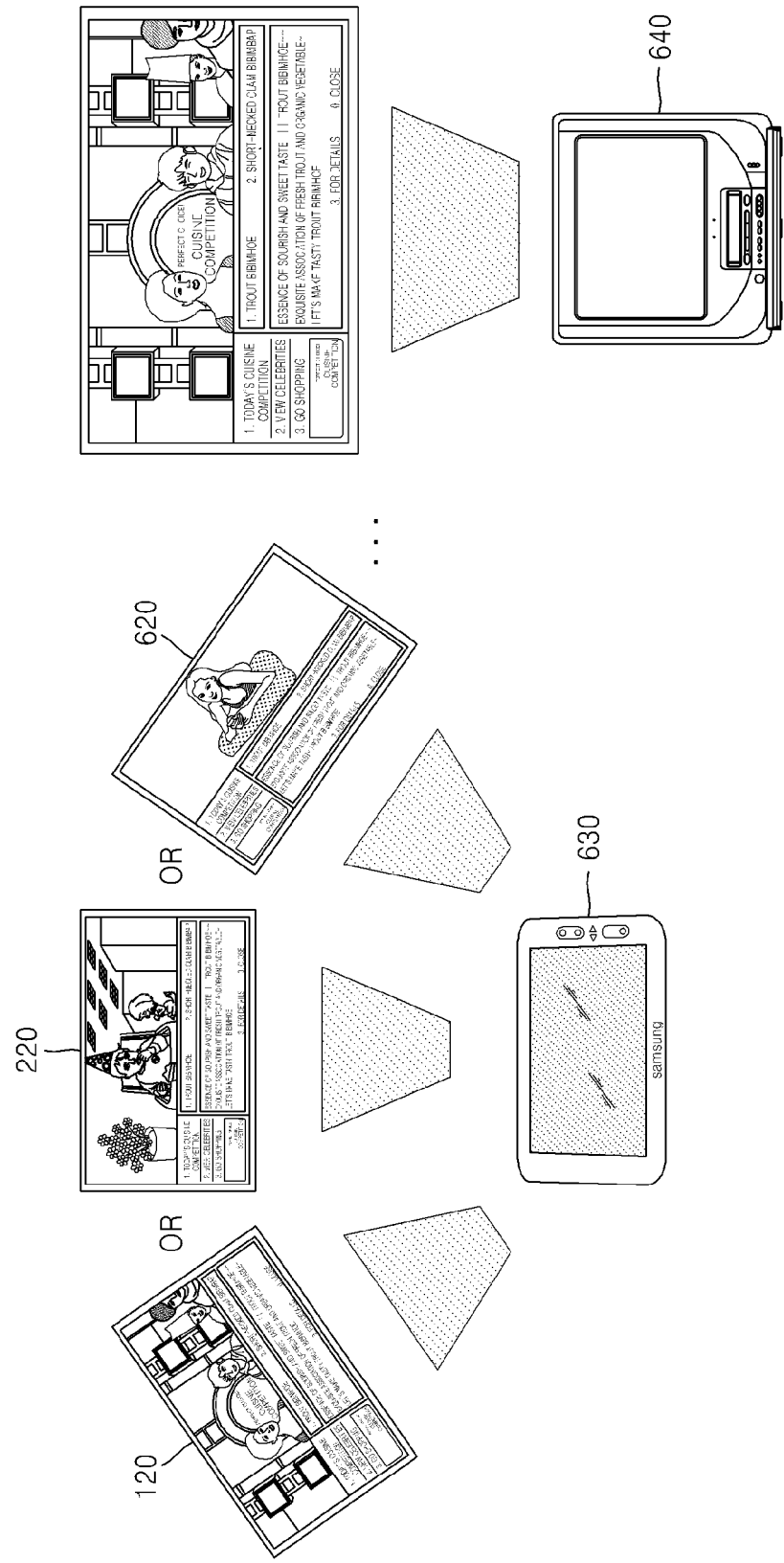
FIG. 6 illustrates examples of video obtained by executing an event using multimedia data according to an exemplary embodiment of the present invention.

FIG. 6 illustrates examples of video being obtained by executing an event by using multimedia data according to an exemplary embodiment of the present invention.

Referring to FIG. 6, a first scene 120 is video obtained by executing an event based on initial information of a null node.

Second and third scenes 220 and 620 are a plurality of pieces of video that are obtained by executing the event based on the object information of the null node, which is changed in response to a request for an event change from the outside.

A first terminal 630 supports the format of multimedia data generated by the generating apparatus 300.

A second terminal 640 does not support the format of the multimedia data generated by the generating apparatus 300.

Figure 1:
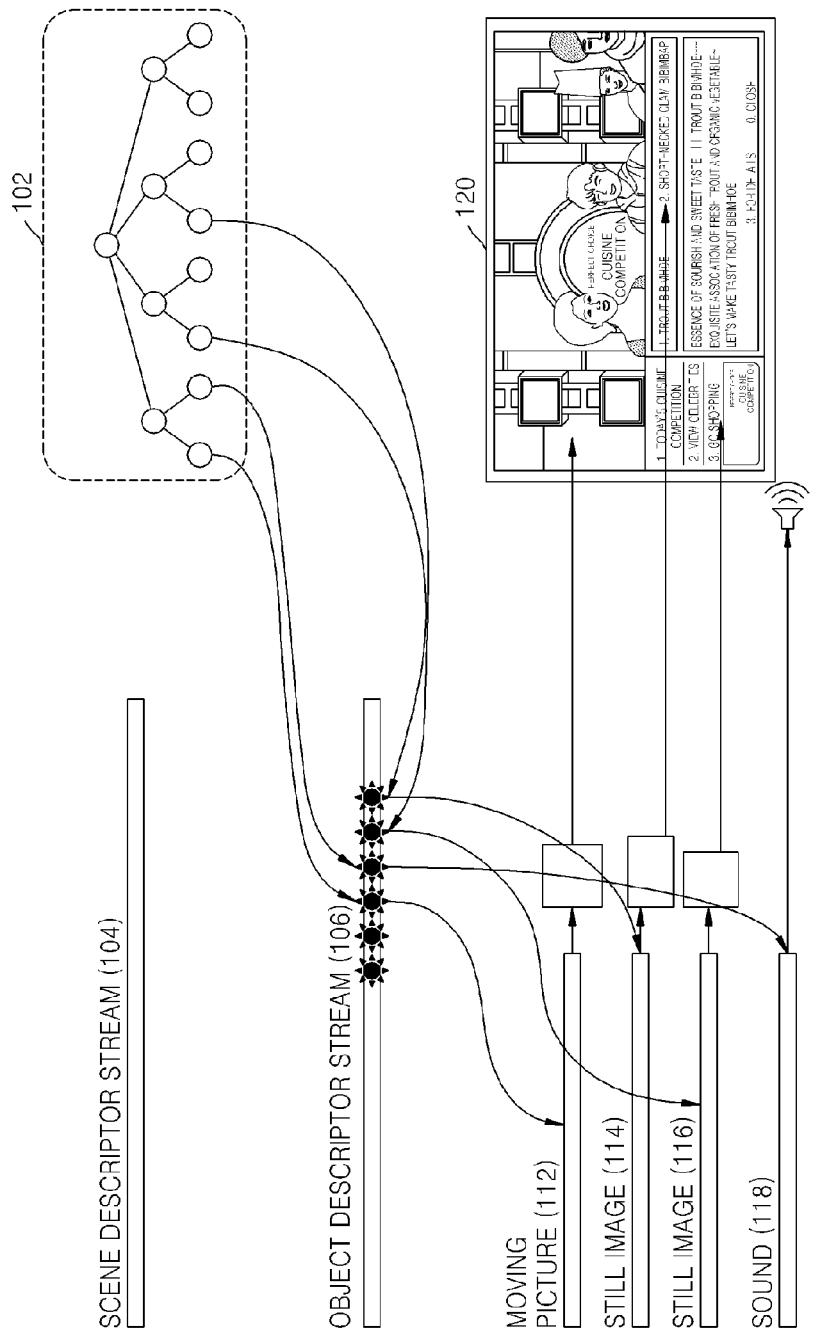
FIG. 1 is a diagram illustrating a related art method of composing a multimedia scene by using a scene tree.
Figure 2:
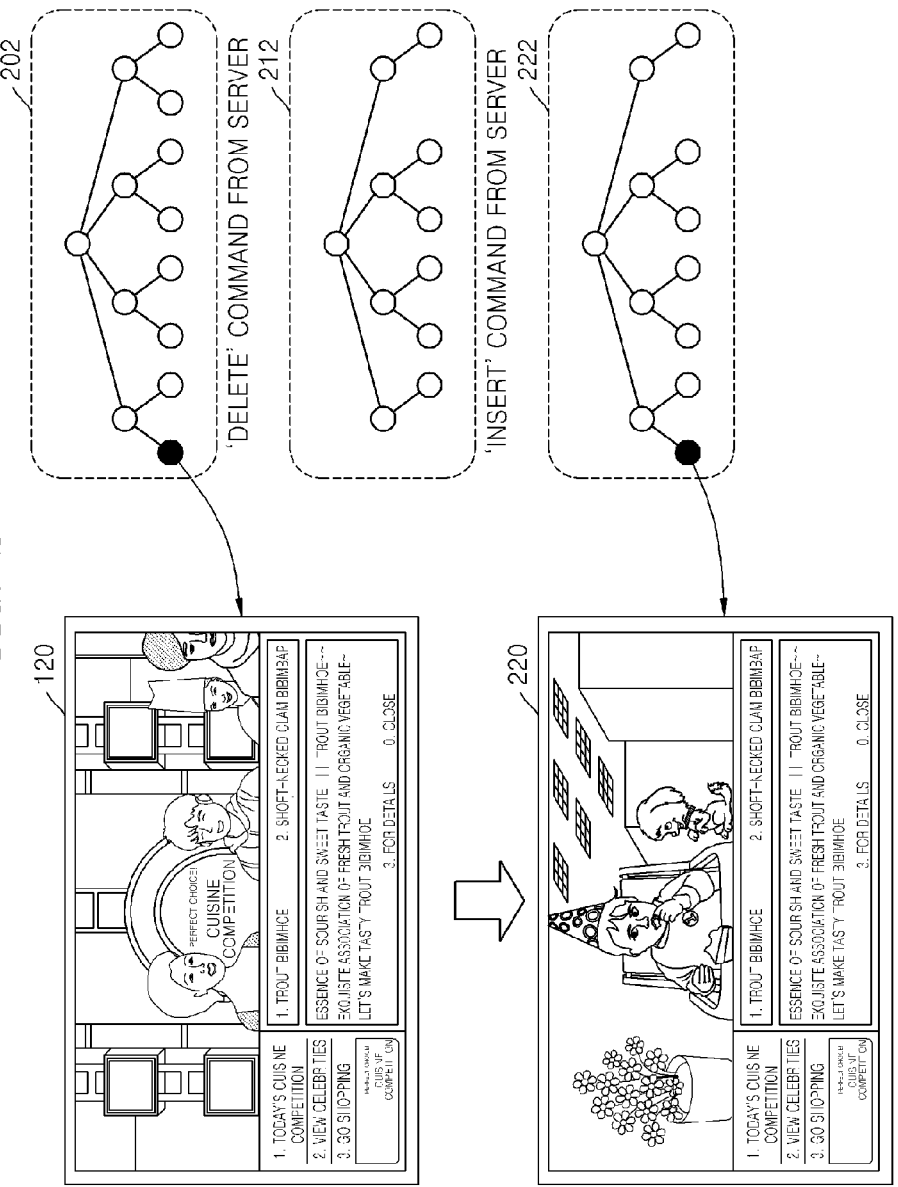
FIG. 2 is a diagram illustrating a related art method of changing an object.

The first terminal 630 supports the format of multimedia data according to exemplary embodiments of the present invention and thus can change objects and execute a desired object by changing the first media source 112 of FIG. 1 in response to a request for an event change. The scenes 120, 220 and 620 are obtained by changing address information "nullUrl" by the object information changing unit 420 in response to a request for an event change received from a user or the outside, and then executing an event by using a media source defined in changed object information by the reconstructing unit 430.

In multimedia data according to exemplary embodiments of the present invention, an event related to each of the objects allocated to nodes, except for a null node, is executed regardless of a request from the outside. Alternatively, objects other than objects whose information can be changed using a null node can be executed in the form of a predetermined template. Thus, a user can compose desired multimedia data by changing only information of an object, an event of which can be changed since information of the object has been allocated to a null node, based on the templates obtained by executing the other objects, and then executing the object, in response to a request from the outside.

For example, regarding each of the scenes 120, 220 and 620, the first media source 112 is an object, an event of which can be changed, but the media sources 114, 116, and 118 are objects that are allocated to nodes except for a null node and information of which thus cannot be changed from the outside. Thus each of the media sources 114, 116, and 118 is executed in the form of a template according to corresponding object information, and thus the user can variously change the media source 112.

The second terminal 640 cannot execute multimedia data according to exemplary embodiments of the present invention since it can neither receive a request for an event change from the outside nor parse the format of the multimedia data. Thus the second terminal 640 can execute only an event of a media source recorded at an address indicated by initial information of a null node.

Figure 7:
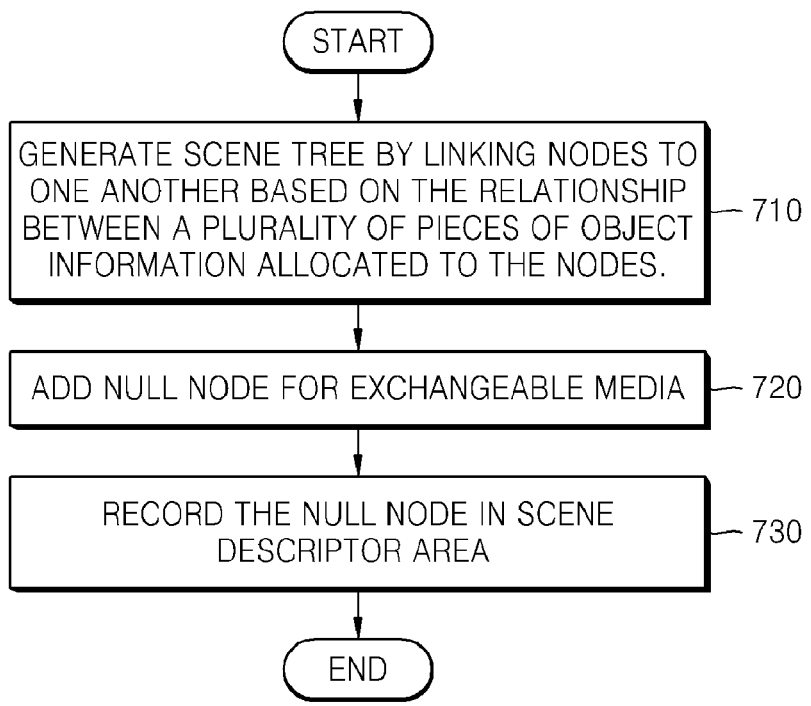
FIG. 7 is a flowchart illustrating a method of generating multimedia data according to an exemplary embodiment of the present invention.

FIG. 7 is a flowchart illustrating a method of generating multimedia data according to an exemplary embodiment of the present invention. Referring to FIG. 7, in operation 710, a scene tree is generated by allocating at least one piece of object information to each of the nodes and then linking the nodes to one another based on the relationship between a plurality of pieces of the object information allocated to the nodes.

In operation 720, a null node to which object information of an exchangeable media object is allocated is added to the scene tree.

In operation 730, the null node is recorded in a scene descriptor area in a scene description language.

Figure 8:
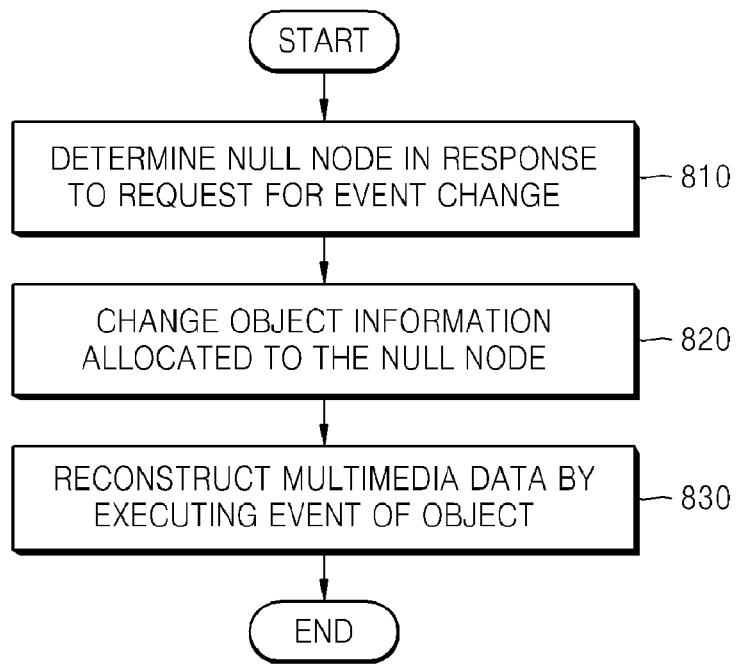
FIG. 8 is a flowchart illustrating a method of reconstructing multimedia data according to an exemplary embodiment of the present invention.

FIG. 8 is a flowchart illustrating a method of reconstructing multimedia data according to an exemplary embodiment of the present invention. Referring to FIG. 8, in operation 810, in a scene tree in which a plurality of nodes to which object information is allocated are linked to one another, a null node to which object information of a media object that can be changed in response to a request for an event change is determined.

In operation 820, the object information allocated to the null node is changed.

In operation 830, multimedia data is reconstructed by executing an object event according to the changed object information.

The above exemplary embodiments of the present invention can be embodied as a computer program, and be realized in a general digital computer capable of executing the program, via a computer readable medium or other transmission media. Examples of the computer readable medium include a magnetic recording medium (a ROM, a floppy disk, a hard disc, etc.), and an optical recording medium (a CD-ROM, a DVD, etc.).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reconstructing multimedia data, in which a multimedia scene comprises media objects based on a scene tree including nodes corresponding to the media objects, the method comprising:

determining by a computer a null node to which first object information of a media object that is to be changed, from among a plurality of object information allocated to a plurality of nodes in a scene tree, in response to a request for an event change is allocated, the scene tree generated by linking the plurality of nodes, to one another;

changing the first object information allocated to the null node; and reconstructing the multimedia data by executing an event according to the changed first object information, wherein an object-oriented multimedia decoding device reconstructs the multimedia data by decoding the object information regarding at least one media object allocated to each node in the scene tree using a scene description language, and reconstructing the multimedia scene, and wherein the scene tree comprises at least one of the null node and wherein the null node comprises a nullUrl which indicates an address location of where the media source for executing an event of an object indicated by the respective null node is recorded, a nullImage ID which indicates an address of video that is to be displayed if the media source of the object allocated to the null node has yet to be defined, an active flag which is an activation indicator indicating whether the event of the object information allocated to the null node is to be activated.

2. The method of claim 1, wherein the determining of the null node comprises if the request for an event change is received, detecting the null node corresponding to a predetermined multimedia object from the scene tree showing a relationship between a plurality of objects constituting the multimedia.

3. The method of claim 1, wherein the changing of the first object information allocated to the null node comprises changing address information from among the first object information allocated to the null node.

4. The method of claim 3, wherein the address information designates at least one of a predetermined media source and an external accessible media source.

5. The method of claim 1, wherein the reconstructing of the multimedia data comprises executing each event by using the plurality of object information allocated to the plurality of nodes.

6. The method of claim 1, wherein if the request for an event change is received, a terminal that supports multimedia data and is allowed to edit and to change the first object information allocated to the null node, changes a media object indicated in the request and then executes a corresponding event; and a terminal that does not support the multimedia data executes an initial media event of the null node.

7. An apparatus for reconstructing multimedia, in which a multimedia scene comprises media objects based on a scene tree including nodes corresponding to the media objects, the apparatus comprising:

a null node determination unit which determines a null node to which first object information of a media object that is to be changed, from among a plurality of object information allocated to a plurality of nodes in a scene tree, in response to a request for an event change is allocated, the scene tree generated by linking the plurality of nodes, to one another;

an object information changing unit which changes the first object information allocated to the null node;

a reconstructing unit which reconstructs the multimedia data by executing an event according to the changed first object information; and a processor which, in cooperation with the null node determination unit, the object information changing unit and the reconstructing unit, decodes the object information regarding at least one media object allocated to each node in the scene tree based on a scene description language, and reconstructs the multimedia scene, wherein the scene tree comprises at least one of the null node and wherein the null node comprises a nullUrl which indicates an address location of where the media source for executing an event of an object indicated by the respective null node is recorded, a nullImage ID which indicates an address of video that is to be displayed if the media source of the object allocated to the null node has yet to be defined, an active flag which is an activation indicator indicating whether the event of the object information allocated to the null node is to be activated.

8. The apparatus of claim 7, wherein the null node determination unit detects the null node from a scene tree showing the relationship between a plurality of objects constituting the multimedia, in response to the request for the event change.

9. The apparatus of claim 7, wherein the object information changing unit changes address information from among the plurality of object information allocated to the plurality of nodes.

10. The apparatus of claim 9, wherein the address information designates at least one of a predetermined media source and an external accessible media source.

11. A non-transitory computer readable medium having recorded thereon a method of reconstructing multimedia data, in which a multimedia scene comprises media objects based on a scene tree including nodes corresponding to the media objects, the method comprising;

determining a null node to which first object information of a media object that is to be changed, from among a plurality of object information allocated to a plurality of nodes in a scene tree, in response to a request for an event change is allocated, the scene tree generated by linking the plurality of nodes, to one another;

changing the first object information allocated to the null node; and reconstructing the multimedia data by executing an event according to the changed first object information, wherein an object-oriented multimedia decoding device reconstructs the multimedia data by decoding the object information regarding at least one media object allocated to each node in the scene tree based on a scene description language, and reconstructing the multimedia scene, and wherein the scene tree comprises at least one of the null node and wherein the null node comprises a nullUrl which indicates an address location of where the media source for executing an event of an object indicated by the respective null node is recorded, a nullImage ID which indicates an address of video that is to be displayed if the media source of the object allocated to the null node has yet to be defined, an active flag which is an activation indicator indicating whether the event of the object information allocated to the null node is to be activated.

12. The method of claim 1, wherein the null node comprises at least one pointer to the object information and which is included in the scene tree.

13. The method of claim 1, wherein the null node comprises an activation flag for controlling execution of an event of the object allocated to the null node.

* * * * *